United States Patent
Yoshinari et al.

(10) Patent No.: US 8,844,290 B2
(45) Date of Patent: Sep. 30, 2014

(54) STEAM SYSTEM

(75) Inventors: Yuji Yoshinari, Matsuyama (JP); Yasuo Ochi, Matsuyama (JP); Hideo Furukawa, Matsuyama (JP); Yasukuni Tanaka, Matsuyama (JP); Yusuke Okamoto, Matsuyama (JP); Kazutaka Baba, Matsuyama (JP)

(73) Assignee: Miura Co., Ltd., Matsuyama-shi (JP)

( * ) Notice: Subject to any disclaimer, the term of this patent is extended or adjusted under 35 U.S.C. 154(b) by 238 days.

(21) Appl. No.: 12/919,653

(22) PCT Filed: Apr. 14, 2008

(86) PCT No.: PCT/JP2008/057276
§ 371 (c)(1),
(2), (4) Date: Aug. 26, 2010

(87) PCT Pub. No.: WO2009/110106
PCT Pub. Date: Sep. 11, 2009

(65) Prior Publication Data
US 2011/0005228 A1    Jan. 13, 2011

(30) Foreign Application Priority Data
Mar. 6, 2008    (JP) ................................ 2008-055685

(51) Int. Cl.
*F01K 13/02* (2006.01)
*F02C 6/16* (2006.01)
*F01D 15/08* (2006.01)
*F01K 7/38* (2006.01)
*F02C 6/00* (2006.01)

(52) U.S. Cl.
CPC . *F01D 15/08* (2013.01); *F02C 6/16* (2013.01); *F05D 2220/31* (2013.01); *Y02E 60/15* (2013.01); *F01K 7/38* (2013.01); *F02C 6/006* (2013.01)
USPC ............................................... 60/660; 60/716

(58) Field of Classification Search
USPC ............................... 60/645–683, 39.182, 417
See application file for complete search history.

(56) References Cited

U.S. PATENT DOCUMENTS 4,214,451 A * 7/1980 Coombes et al. ............... 60/648
4,452,048 A * 6/1984 Geary et al. .................... 60/656
(Continued)

FOREIGN PATENT DOCUMENTS

| JP | 50-5703 | 1/1975 |
| JP | 62-078405 | 4/1987 |

(Continued)

*Primary Examiner* — Thomas Denion
*Assistant Examiner* — Steven D Shipe
(74) *Attorney, Agent, or Firm* — Fox Rothschild LLP

(57) ABSTRACT

A steam engine and an electric motor are arranged, which respectively drives an air compressor. The compressed air from the air compressor is supplied to a compressed air using device through a common air tank. The steam is supplied to the steam engine through a steam supply path, and the steam used in the steam engine is supplied to a steam using device through a steam exhaust path. The steam pressure is monitored by a pressure sensor arranged in a steam header ahead of the steam exhaust path. The air pressure is monitored by a pressure sensor arranged in an air tank. A steam supply valve is controlled based on the steam pressure and the air pressure, and the electric motor is controlled based on the air pressure. The steam engine is preferentially driven over the electric motor by shifting the target value of the air pressure.

7 Claims, 2 Drawing Sheets

(56) References Cited

U.S. PATENT DOCUMENTS

| | | | |
|---|---|---|---|
| 5,507,145 A * | 4/1996 | Kurten et al. | 60/652 |
| 5,778,675 A * | 7/1998 | Nakhamkin | 60/652 |
| 6,141,950 A * | 11/2000 | Smith et al. | 60/783 |
| 6,543,234 B2 * | 4/2003 | Anand et al. | 60/772 |
| 6,581,411 B2 * | 6/2003 | Massimo et al. | 62/643 |
| 7,150,154 B2 * | 12/2006 | Althaus et al. | 60/727 |
| 7,269,956 B2 * | 9/2007 | Gericke et al. | 60/782 |
| 7,500,349 B2 * | 3/2009 | Althaus | 60/39.511 |
| 7,727,486 B2 * | 6/2010 | Couch et al. | 422/144 |
| 7,954,330 B2 * | 6/2011 | Althaus | 60/772 |
| 2001/0004830 A1 * | 6/2001 | Wakana et al. | 60/39.182 |
| 2002/0116945 A1 * | 8/2002 | Buckland | 62/645 |
| 2003/0015475 A1 * | 1/2003 | Liebig et al. | 210/698 |
| 2004/0107700 A1 * | 6/2004 | McClanahan et al. | 60/670 |
| 2008/0000233 A1 * | 1/2008 | Althaus et al. | 60/659 |
| 2008/0148734 A1 * | 6/2008 | Althaus et al. | 60/650 |

FOREIGN PATENT DOCUMENTS

| | | |
|---|---|---|
| JP | 63-045403 | 2/1988 |
| JP | 04-353201 | 8/1992 |
| JP | 09-068006 | 3/1997 |

* cited by examiner

STEAM SYSTEM

BACKGROUND OF THE INVENTION

1. Field of the Invention

The present invention relates to a steam system that reduces power consumption by driving a compressor and the like using steam.

The present application claims priority based on Japanese Patent Application No. 2008-055685 filed in Japan on Mar. 6, 2008, the contents of which are hereby incorporated by reference.

2. Description of the Related Art

Japanese Unexamined Patent Publication No. 63-45403 (Claims, FIG. 1, and P. 2, lower left column, lines 1 to 5 of publication) discloses a method of holding the back pressure of the steam on the steam flow-out side constant regardless of the load fluctuation by driving an air compressor (2) with a screw-type expander (1), and controlling the steam that flows into the screw-type expander (1) with an adjustable valve (10) at the time of load fluctuation of the air compressor (2) and controlling a by-pass valve (9) arranged between the steam flow-in side and the steam flow-out side of the screw-type expander (1). The by-pass valve (9) is controlled by detecting the back pressure of a steam outlet tube (5) from the screw-type expander (1) with a detector (20). The adjustable valve (10) is controlled by detecting number of rotations of a drive shaft of the screw-type expander (1) with a detector (23).

Japanese Unexamined Patent Publication No. 9-68006 (Claims 1, 6, 8, paragraphs [0019], [0021], [0024], and FIG. 1) discloses a gas turbine facility including a gas turbine (1), a power generator (8) driven by the gas turbine (1), an exhaust heat boiler (13) that uses the exhaust gas of the gas turbine (1) as a heat source, a screw-type steam engine (30) that uses the steam supplied from the exhaust heat boiler (13) as a power source, and a fuel compressor (11), driven by the steam engine (30), for compressing fuel and supplying the same to a combustor (3) of the gas turbine (1). In such a gas turbine facility, the fuel supply amount from the fuel compressor (11) to the gas turbine (1) is adjusted by a by-pass control valve (37) arranged between an inlet and an outlet of the fuel compressor (11), but the steam amount to be supplied to the steam engine (30) is adjusted by a control valve (32) with respect to a large load fluctuation that cannot be fully controlled with the by-pass control valve (37). The fuel compressor (11) is driven by a motor (10) at the time of startup of the exhaust heat boiler (13) or at the time of steam engine (30) failure.

Japanese Unexamined Patent Publication No. 4-353201 (paragraphs [0022] to [0028], and FIG. 1) discloses a device in which a steam turbine (9) is connected on an input side of a screw rotor of a compressor (1) by way of an electric motor (7) and a clutch (8), where the power by the steam turbine (9) is added to the power by the motor (7) to drive the screw rotor at the time of the operation of the steam turbine (9). In such a device, the steam turbine (9) is switched between drive and stop by the opening and closing of a steam valve (10). Focusing on the fact that a shaft power of the compressor (1) is dominated by an intake side pressure and a discharge side pressure, the steam valve (10) is opened to operate the steam turbine (9) when the shaft power of the compressor (1) is within a tolerable power range based on a low-pressure pressure detector (18) for detecting the intake side pressure of the compressor (1) and a high-pressure pressure detector (19) for detecting the discharge side pressure. The compressor (1) has the slide valve thereof controlled by a capacity control device (14) so as to be capacity controlled.

SUMMARY OF THE INVENTION

In the case of the invention disclosed in Japanese Unexamined Patent Publication No. 63-45403, however, the compressor cannot be driven if steam does not exist such as at the time of startup of the boiler. On the other hand, in the case of the invention disclosed in Japanese Unexamined Patent Publication No. 9-68006, although a motor is arranged, such a motor is driven only at the time of startup of the exhaust heat boiler or at the time of steam engine failure. The invention disclosed in Japanese Unexamined Patent Publication No. 4-353201 also includes a motor, but the control is such that the drive by the motor is prioritized over the steam engine. Furthermore, the steam valve (10) can only be opened and closed and the output adjustment of the steam engine cannot be carried out when the steam turbine is used as the steam engine.

Moreover, none of the inventions disclosed in the patent documents control the steam supply to the steam engine in view of also the usage load of the steam. In other words, none of the inventions disclosed in the patent documents control the steam engine and the motor based on both the usage load of the steam and the usage load of the fluid discharged from the compressor.

To solve the problems, an object of the present invention is to provide an efficient and stable operation by including an electric motor and the like other than the steam engine, and controlling the steam engine and the like based on both the steam load and the fluid load. Preferably, another object of the present invention is to save energy by prioritizing the drive by the steam engine.

The present invention has been proposed to solve the above problem, where the invention described in claim 1 relates to a steam system including a first prime mover that generates power using steam; a first driven machine, driven by the first prime mover, for discharging or taking in fluid; a second prime mover that generates power using other than steam; a second driven machine, driven by the second prime mover, for discharging or taking in fluid with respect to a space to which the fluid is discharged or from which the fluid is taken in by the first driven machine; and a controller for controlling the first prime mover and/or the second prime mover based on a steam load of an area where steam used in the first prime mover is supplied and a fluid load in the space to which the fluid is discharged or from which the fluid is taken in by each driven machine.

According to the invention described in claim 1, the fluid can be stably discharged or taken in regardless of the presence of steam and the steam load since the second prime mover configured by an electric motor, and the like is arranged in addition to the first prime mover that generates power using steam. The operation efficiency can be enhanced by controlling each prime mover taking not only the fluid load but also the steam load into consideration.

The invention described in claim 2 relates to the steam system according to claim 1, wherein a drive ratio of the first prime mover and the second prime mover is changed based on a steam pressure of the area where the steam used in the first prime mover is supplied and a pressure in the space to which the fluid is discharged or from which the fluid is taken in by each driven machine.

According to the invention described in claim 2, the drive ratio of each prime mover is controlled based on the pressure. Therefore, each prime mover can be controlled and the operation efficiency can be enhanced taking not only the fluid load but also the steam load into consideration with a simple configuration and control.

The invention described in claim 3 relates to the steam system according to claim 1 or 2, wherein the first prime mover is controlled based on the steam pressure of the area where the steam used in the first prime mover is supplied and the pressure in the space to which the fluid is discharged or from which the fluid is taken in by each driven machine; and the second prime mover is controlled based on the pressure in the space to which the fluid is discharged or from which the fluid is taken in by each driven machine.

According to the invention described in claim 3, the drive ratio of each prime mover is controlled based on the pressure. Furthermore, the first prime mover is controlled based on the steam pressure and the fluid pressure, and the second prime mover is controlled based on the fluid pressure. Therefore, each prime mover can be controlled and the operation efficiency can be enhanced taking not only the fluid load but also the steam load into consideration with a simple configuration and control.

The invention described in claim 4 relates to the steam system according to claim 3, wherein the steam supply to the first prime mover is controlled based on the pressure in the space to which the fluid is discharged by each driven machine so as to maintain an interior of the space to a first set pressure region; the second prime mover is controlled based on the pressure in the space to which the fluid is discharged by each driven machine so as to maintain an interior of the space to a second set pressure region; and a lower limit pressure of the first set pressure region is set higher than a lower limit pressure of the second set pressure region, and an upper limit pressure of the second set pressure region is set lower than an upper limit pressure of the first set pressure region.

According to the invention described in claim 4, the first set pressure region for controlling the first prime mover and the second set pressure region for controlling the second prime mover respectively have the upper limit and the lower limit shifted so as to prioritize the drive of the first prime mover. Thus, the use of steam is prioritized and the energy can be saved.

The invention described in claim 5 relates to the steam system according to claim 4, wherein the steam is supplied to the first prime mover only when the steam pressure of the area where the steam used in the first prime mover is supplied is smaller than a predetermined value.

According to the invention described in claim 5, the steam does not become a waste since the first prime mover is driven only when the steam load is present.

The invention described in claim 6 relates to the steam system according to any one of claims 1 to 5, wherein the first prime mover is a screw-type steam engine; the first driven machine is an air compressor; the second prime mover is an electric motor; and the second driven machine is an air compressor.

According to the invention described in claim 6, the efficiency becomes better than the turbine type through the use of the screw-type steam engine. In the case of the screw-type steam engine, the output can easily be adjusted by adjusting the steam supply amount. Furthermore, excellent versatility is realized since the air compressor widely used for operation of an air driving machine in various types of factories and business establishments, for manufacturing process such as blowing and drying, and in other fields is driven.

The invention described in claim 7 relates to the steam system according to claim 6, wherein compressed air from each driven machine is suppliable to a compressed air using device through a common tube path and/or a tank; steam from a steam supply source is suppliable to a steam header through the first prime mover and also suppliable to the steam header through a depressurization valve; the steam of the steam header is suppliable to a steam using device; the steam supply to the first prime mover is continued if determined that an air load is present when a detected pressure of a pressure sensor arranged in the tube path or the tank is smaller than a set value and determined that a steam load is present when a detected pressure of a pressure sensor arranged in the steam header is smaller than a predetermined value; the steam supply to the first prime mover is stopped if determined that the air load is not present when the detected pressure of the pressure sensor arranged in the tube path or the tank is greater than or equal to the set value and determined that the steam load is not present when the detected pressure of the pressure sensor arranged in the steam header is greater than or equal to the predetermined value; and only the second prime mover is operated if determined that the air load is present when the detected pressure of the pressure sensor arranged in the tube path or the tank is smaller than the set value and determined that the steam load is not present when the detected pressure of the pressure sensor arranged in the steam header is greater than or equal to the predetermined value.

According to the invention described in claim 7, each prime mover is prevented from being wastefully operated and the operation efficiency can be enhanced by carrying out the control in view of the air load and the steam load.

The invention described in claim 8 relates to the steam system according to any one of claims 1 to 7, wherein the first driven machine and the second driven machine are configured as one common driven machine; and the common driven machine is drivable by the first prime mover and the second prime mover.

According to the invention described in claim 8, the configuration can be simplified and miniaturization can be achieved by having a common driven machine drivable by each prime mover.

According to the steam system of the present invention, the operation can be efficiently and safely carried out by controlling the steam engine and the like based on both the steam load and the fluid load. Furthermore, the energy can be saved by prioritizing the drive by the steam engine.

DETAILED DESCRIPTION OF THE PREFERRED EMBODIMENTS

Figure 1:
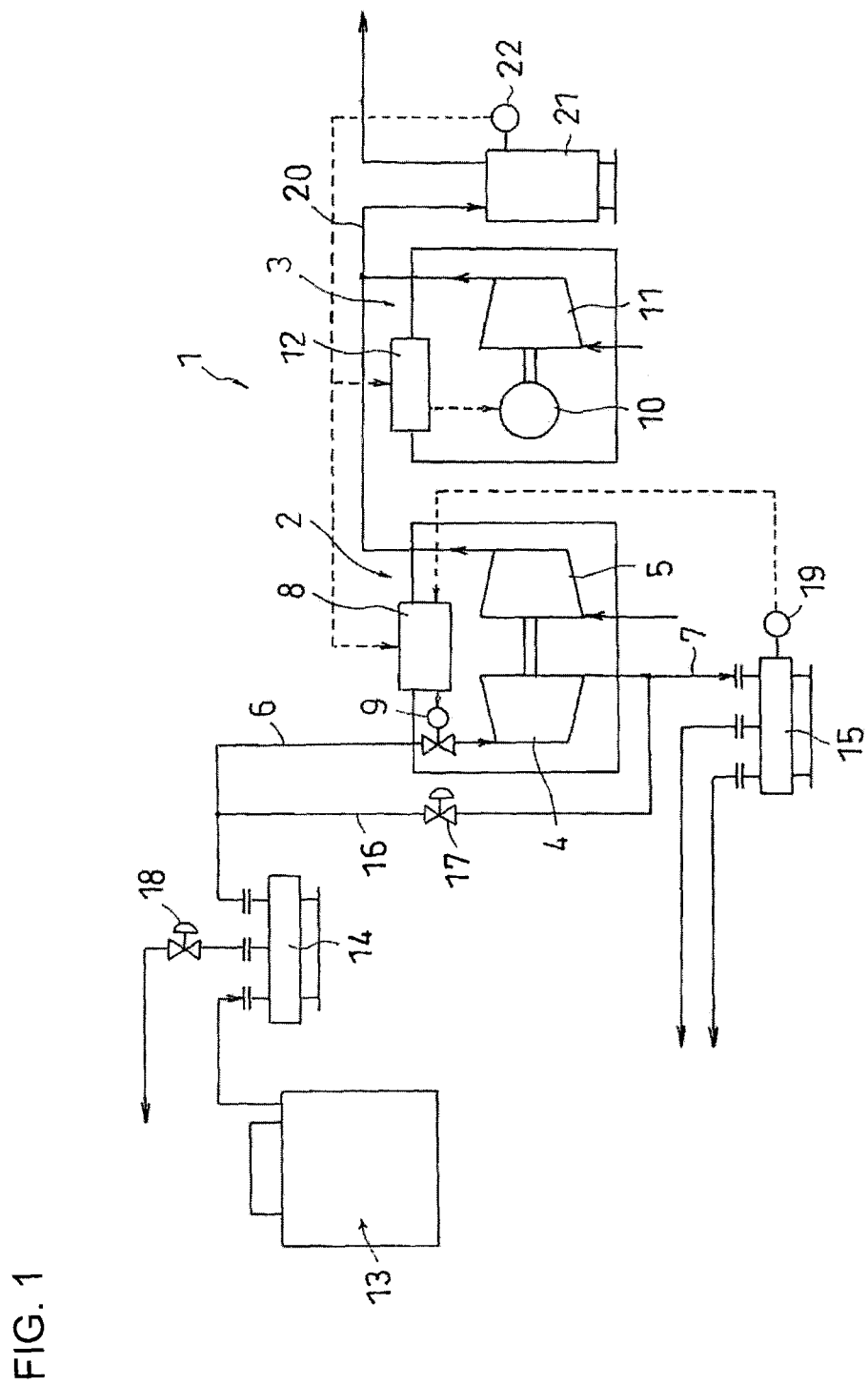
FIG. 1 is a schematic view showing one example of a steam system of the present invention.

Embodiments of the present invention will now be described.

The steam system of the present invention includes a plurality of prime movers used in combination with a steam engine, an electric motor, and the like, and one or a plurality of driven machines such as a compressor or a vacuum pump driven by the prime mover. In the present embodiment, a first prime mover that generates power using steam, a first driven machine driven by the first prime mover, a second prime mover that generates power using other than steam, and a second driven machine driven by the second prime mover are arranged.

The first prime mover is a steam engine that generates power using steam. The steam engine may be a steam turbine, but is suitably a screw-type steam engine. The screw-type steam engine is a device in which the steam is introduced between screw rotors that engage with each other, and the steam expands while rotating the screw rotors with the steam thereby causing depressurization so that the power is obtained by the rotation of the screw rotor at the time.

The steam is supplied to the steam engine from a steam supply source. Typically, the steam supply source is a steam boiler. The steam from the steam boiler may be supplied to a steam header, and the steam of the steam header may be supplied to the steam engine through a steam supply path.

The steam engine is controlled by controlling the presence or the amount of steam supply to the steam engine. Specifically, a steam supply valve is arranged on the steam supply path to the steam engine, and the opening/closing or the opening degree of the steam supply valve is controlled. The presence or the amount of steam supply to the steam engine thus can be changed, and the presence or the output of the operation of the steam engine can be changed.

For instance, if the steam engine is a steam turbine, the presence of steam supply to the steam turbine can be switched by controlling the opening/closing of the steam supply valve. The presence of the operation of the steam turbine thus can be changed. If the steam engine is a screw-type steam engine, the opening/closing of the steam supply valve may be controlled similar to the steam turbine, or the opening degree of the steam supply valve may be controlled. When controlling the opening degree of the steam supply valve, the output of the screw-type steam engine can be changed by adjusting the steam supply amount to the screw-type steam engine.

However, the control of the steam engine is not limited to the above configurations. In other words, the steam engine merely needs to have the presence or the amount of steam supply changeable, and the steam supply valve may not be arranged on the steam supply path and the control may not be necessarily made by such a steam supply valve. For instance, the steam supply path to the steam engine and the steam exhaust path from the steam engine may be connected with the by-pass path, and the opening/closing or the opening degree of the by-pass valve arranged on the by-pass path may be controlled. Such a by-pass valve may be arranged in addition to the steam supply valve. In this case, the by-pass valve may be a self-depressurization valve.

The steam engine also functions as a depressurization valve as it depressurizes steam. Thus, the steam used in the steam engine can be used similar to the steam having been passed the depressurization valve of the prior art. In other words, the steam from the steam boiler is conventionally supplied to a steam using device through the depressurization valve, and similarly, the steam used in the steam engine can also be supplied to the steam using device. In this case, the steam from the steam engine may be supplied to the steam header through the steam exhaust path, and the steam of the steam header may be supplied to the steam using device.

The first driven machine is a device that is driven by the first prime mover, and that discharges or takes in fluid. Specifically, the first driven machine includes a pump, an air blower, a compressor, or a vacuum pump. The first driven machine discharges fluid in the case of the pump, the air blower, or the compressor, and takes in fluid in the case of the vacuum pump.

The first driven machine is, for example, an air compressor. Such an air compressor may be of any type such as a reciprocating type or a rotating type, but is a screw-type compressor in the present embodiment. The screw-type compressor is a device that takes in gas to between the screw rotors that rotate while engaging with each other, compresses the gas through rotation of the screw rotors and discharges the same.

The second prime mover is a device that generates power using other than steam. The second prime mover is typically an electric motor (motor), but may be a diesel engine. If the second prime mover is an electric mover, it may be ON/OFF controlled or inverter controlled. As well known in the art, the number of rotations of the electric motor can be changed by changing the frequency of the power supply to apply to the electric motor according to the inverter control.

The second driven machine is a device that is driven by the second prime mover, and that discharges or takes in fluid. Specifically, the second driven machine includes a pump, an air blower, a compressor, or a vacuum pump. The second driven machine discharges fluid in the case of the pump, the air blower, or the compressor, and takes in fluid in the case of the vacuum pump.

The second driven machine is a device that discharges or takes in fluid, similar to the first driven machine, with respect to a space to which the fluid is discharged or from which the fluid is taken in by the first driven machine. Thus, the second driven machine has the same function as the first driven machine. For instance, if the first driven machine is an air compressor, the second driven machine is also an air compressor. The second driven machine may not necessarily have the same mechanism as long as the functions are the same as those of the first driven machine. For instance, if the first driven machine is a screw-type air compressor, the second driven machine is not limited to a screw-type and may be a reciprocating type (reciprocal compressor) as long as it is an air compressor.

The first prime mover and the second prime mover may be controlled by a common controller or may be independently controlled by an individual controller. In the former case, the first prime mover and the second prime mover are controlled based on the fluid load and the steam load, to be described later. In the latter case, the first prime mover is controlled based on the fluid load and the steam load, whereas the second prime mover is preferably controlled based on the fluid load.

The fluid load is the load of the fluid in the space to which the fluid is discharged or from which the fluid is taken in by each driven machine. Specifically, if the driven machine is the pump, the air blower, or the compressor, the fluid load is the usage amount of the fluid in the space to which such a driven machine discharges. If the driven machine is the vacuum pump, the fluid load is the existence amount of the fluid in the space from which such a driven machine takes in. That is, if each driven machine is the vacuum pump, the decrease in the degree of vacuum indicates that the fluid load is present.

Either fluid load can be detected by the pressure in the space to which the fluid is discharged or from which the fluid is taken in by each driven machine. For instance, if the driven machine is the air compressor, the usage load (referred to as air load) of the compressed air can be detected based on the pressure in the common tube that sends the compressed air to one or a plurality of compressed air using devices, or the tank. In other words, when the compressed air is used in the compressed air using device, the air load can be detected as the air pressure in the tube or the tank lowers.

The steam load is the usage amount of the steam at the area where the steam used in the first prime mover (steam engine) is supplied. The steam load can be detected by the steam pressure at the area where the steam used in the first prime mover is supplied. For instance, the usage load (steam load) of the steam can be detected based on the steam pressure in the steam exhaust path from the first prime mover or the steam header arranged ahead of the steam exhaust path. In other words, when the steam is used in the steam using device, the steam load can be detected as the steam pressure in the steam exhaust path or the steam header lowers.

Thus, both the fluid load and the steam load can be easily detected with pressure. Therefore, the first prime mover and/or the second prime mover can be controlled based on the pressure in the space to which the fluid is discharged or from which the steam is taken in by each driven machine and the steam pressure at the area where the steam used in the first prime mover is supplied. For instance, the first prime mover is controlled based on the fluid pressure and the steam pressure, whereas the second prime mover can be controlled based on the fluid pressure.

The first prime mover and the second prime mover are controlled with the presence or the amount of the respective drive changed. The drive ratio of the first prime mover and the second prime mover thus can be changed. In this case, the control is easily made in the following manner, and the energy can be saved. In other words, the steam supply to the first prime mover is continued if the fluid load and the steam load are present, and the steam supply to the first prime mover is stopped if the fluid load and the steam load are not present. Furthermore, only the second prime mover is operated if the fluid load is present but the steam load is not present. In this case (case in which the fluid load is present but the steam load is not present), however, the steam supply to the first prime mover may be executed if desired. The steam is supplied to the steam header and the steam using device through the by-pass path if the fluid load is not present but the steam load is present.

If each driven machine is an air compressor and the fluid load is the air load, whether or not the air load is present can be detected by determining whether or not the detected pressure of a pressure sensor arranged in the tube or the tank for sending the compressed air to the compressed air using device is smaller than a set value. That is, determination is made that the air load is present if smaller than the set value, and determination is made that the air load is not present if greater than or equal to the set value. Whether or not the steam load is present can be detected by determining whether or not the detected pressure of a pressure sensor arranged in the steam header and the like for receiving the steam used in the first prime mover is smaller than a predetermined value. That is, determination is made that the steam load is present if smaller than the predetermined value, and determination is made that the steam load is not present if greater than or equal to the predetermined value. This is the same for when each driven machine is the pump or the air blower instead of the compressor. If each driven machine is a vacuum pump, on the contrary, whether or not the fluid load is present can be detected by determining whether or not the detected pressure of a pressure sensor arranged in a space from which the vacuum pump vacuums is greater than or equal to a set value.

In any event, the drive of the first prime mover (steam engine) is prioritized when the steam load is present, and the second prime mover is preferably driven for aid if not sufficient with only the first prime mover to save energy. In this case, the control is easily made in the following manner when individually controlling the first prime mover and the second prime mover.

In other words, the steam supply to the first prime mover is controlled based on the pressure in the space to which the fluid is discharged or from which the fluid is taken in by each driven machine so as to maintain the interior of the space in a first set pressure region. The second prime mover is controlled based on the pressure in the space to which the fluid is discharged or from which the fluid is taken in by each driven machine so as to maintain the interior of the space in a second set pressure region. If each driven machine is the pump, the air blower, or the compressor, the lower limit pressure of the first set pressure region is set higher than the lower limit pressure of the second set pressure region, and the upper limit pressure of the second set pressure region is set lower than the upper limit pressure of the first set pressure region. If each driven machine is the vacuum pump, the upper limit pressure of the first set pressure region is set lower than the upper limit pressure of the second set pressure region, and the lower limit pressure of the second set pressure region is set higher than the lower limit pressure of the first set pressure region. In either case, the steam supply to the first prime mover is preferably carried out only when the steam pressure of the area where the steam used in the first prime mover is supplied is smaller than the predetermined value. In such control, the first prime mover has the presence of steam supply controlled, and the second prime mover (electric motor) may be ON/OFF controlled.

In the above description, the first driven machine and the second driven machine are configured as separate bodies, but may be configured as one common driven machine. In such a case, the common driven machine can be driven by the first prime mover and the second prime mover. For instance, the steam drive and the electric drive may be configured with one unit by attaching the electric motor coaxial with the steam engine.

In the above description, an example in which one of each of the first prime mover and the first driven machine, and the second prime mover and the second driven machine are installed has been described, but they may be installed in plurals. For instance, two second prime movers and two second driven machines may be installed in parallel in the above-described steam system. In this case as well, each second prime mover is controlled similar to the manner described above.

Example

Specific examples of the present invention will be described in detail below with reference to the drawings.

FIG. 1 is a schematic view showing one example of a steam system of the present invention. A steam system 1 of the present example includes a steam drive-type compressor unit 2, and an electric drive-type compressor unit 3.

The steam drive-type compressor unit 2 includes a steam engine (first prime mover) 4 that generates power when receiving steam, and an air compressor (first driven machine) 5 driven by the steam engine 4. The steam engine 4 may be a steam turbine, but is suitably a screw-type steam engine. The screw-type steam engine is a device in which the steam is introduced between screw rotors that engage with each other, and the steam expands while rotating the screw rotors with the steam thereby causing depressurization so that the power is obtained by the rotation of the screw rotor at the time.

The steam is supplied to the steam engine 4 through a steam supply path 6, and the steam is exhausted through a steam exhaust path 7. A controller (first controller) 8 of the steam drive-type compressor unit 2 controls a steam supply valve 9 arranged on the steam supply path 6 to control the steam engine 4. In the present example, the presence of operation of the steam engine 4 is switched by controlling the opening/ closing of the steam supply valve 9. The output of the steam engine 4 may be adjusted by adjusting the opening degree of the steam supply valve 9.

The air compressor 5 may be of any type, but is suitably a screw-type compressor. The screw-type compressor is a device that takes in gas to between the screw rotors that rotate while engaging with each other, compresses the gas through rotation of the screw rotors and discharges the same. The air compressor 5 is directly driven by the steam engine 4 without interposing a power generator.

The electric drive-type compressor unit 3 includes an electric motor (first driven machine) 10 that generates power when receiving electrical power, and an air compressor (second driven machine) 11 driven by the electric motor 10. The air compressor 11 also may be of any type but is suitably a screw-type compressor, similar to the steam drive-type compressor unit 2.

A controller (second controller) 12 of the electric drive-type compressor unit 3 controls the electric motor 10. In the present example, the presence of operation of the electric motor 10 is switched by controlling the presence of electric power supply to the electric motor 10. The output of the electric motor 10 may be adjusted by inverter controlling the electric motor 10. That is, the number of rotations of the electric motor 10 may be changed by changing the frequency of the power supply to apply to the electric motor 10 in the inverter.

As described above, the steam engine 4 is driven when supplied with steam. In the illustrated example, the steam from a steam boiler 13 is supplied to the steam engine 4 through a first steam header 14 and the steam supply path 6. The steam used in the steam engine 4 can be supplied to various types of steam using devices (not shown) through a second steam header 15.

The first steam header 14 and the second steam header 15 are also connected through a by-pass path 16. In the illustrated example, an upstream portion than the steam supply valve 9 of the steam supply path 6 from the first steam header 14 to the steam engine 4 and an intermediate portion of the steam exhaust path 7 from the steam engine 4 to the second steam header 15 are connected with the by-pass path 16. A by-pass valve 17 is arranged at the intermediate portion of the by-pass path 16. The by-pass valve 17 may be an electromagnetic valve or an electric valve that is open/close controlled by a controller, and is a self-depressurization valve in the present example. Specifically, the by-pass valve 17 is a depressurization valve that self-adjusts the opening degree mechanically so as to maintain the steam pressure in the second steam header 15 to a predetermined steam pressure.

Therefore, the steam system 1 of the present example includes two steam headers 14, 15 having different pressures and temperatures. The steam in each steam header 14, 15 can be supplied to the desired steam using device (not illustrated), respectively. Since the steam in each steam header 14, 15 has a different temperature, the steam can be used according to applications. In other words, the steam may be supplied from the first steam header 14 if steam of a relatively high temperature is required, and the steam may be supplied from the second steam header 15 if steam of lower temperature is required.

The steam from either steam header 14, 15 can be supplied to the steam using device through a depressurization valve 18 (illustrated only on the first steam header 14 side) as desired. Since the steam engine 4 also functions as the depressurization valve, the steam in the second steam header 15 can be used as is as steam having been passed the depressurization valve. The operating state of the boiler 13 of the present example is controlled based on the steam pressure in the first steam header 14. Specifically, the combustion amount of the burner is controlled based on the steam pressure in the first steam header 14.

The second steam header 15 includes a first pressure sensor 19 to grasp the usage load of the steam thereof. The steam pressure in the second steam header 15 is monitored by the first pressure sensor 19. Therefore, whether or not the steam load is present can be determined by determining whether or not such a steam pressure is smaller than a predetermined value. In other words, when the steam is used, the usage load of the steam can be detected by determining whether or not the steam pressure in the second steam header 15 is smaller than a predetermined value as the steam pressure in the second steam header 15 lowers.

The compressed air from each air compressor 5, 11 can be supplied to a hollow air tank 21 through a compressed air path 20, and then supplied from the air tank 21 to one or a plurality of compressed air using devices (not illustrated). The air tank 21 includes a second pressure sensor 22 to grasp the usage load of the compressed air. The air pressure in the air tank 21 is monitored by the second pressure sensor 22. Therefore, whether or not the air load is present can be determined by determining whether or not such an air pressure is smaller than a set value. In other words, when the compressed air is used, the usage load of the compressed air can be detected by determining whether or not the air pressure in the air tank 21 is smaller than a set value as the air pressure in the air tank 21 lowers.

In the steam system 1 of the present example, the drive of the compressor by the steam engine 4 is prioritized over the electric motor 10 when the steam load is present, and the electric motor 10 is driven for aid if not sufficient with only the steam engine 4 to save energy. In this case, the steam drive-type compressor unit 2 and the electric drive-type compressor unit 3 monitor the air pressure in the air tank 21 by the second pressure sensor 22, so that the startup and the stop of the steam engine 4 or the electric motor 10 are switched.

If determined that the air load is present when the air pressure of the second pressure sensor 22 is smaller than a set value (to be hereinafter described as P1U) and determined that the steam load is present when the steam pressure of the first pressure sensor 19 is smaller than a predetermined value, the steam supply valve 9 is opened to continuously operate the steam engine 4. If determined that the air load is not present when the air pressure of the second pressure sensor 22 is greater than or equal to the set value and determined that the steam load is not present when the steam pressure of the first pressure sensor 19 is greater than or equal to the predetermined value, on the other hand, the steam supply valve 9 is closed to stop the steam engine 4. Furthermore, if determined that the air load is present when the air pressure of the second pressure sensor 22 is smaller than the set value and determined that the steam load is not present when the steam pressure of the first pressure sensor 19 is greater than or equal to the predetermined value, the electric motor 10 is operated alone. Thus, the steam drive-type compressor unit 2 is preferentially operated as long as the steam load is present.

Figure 2:
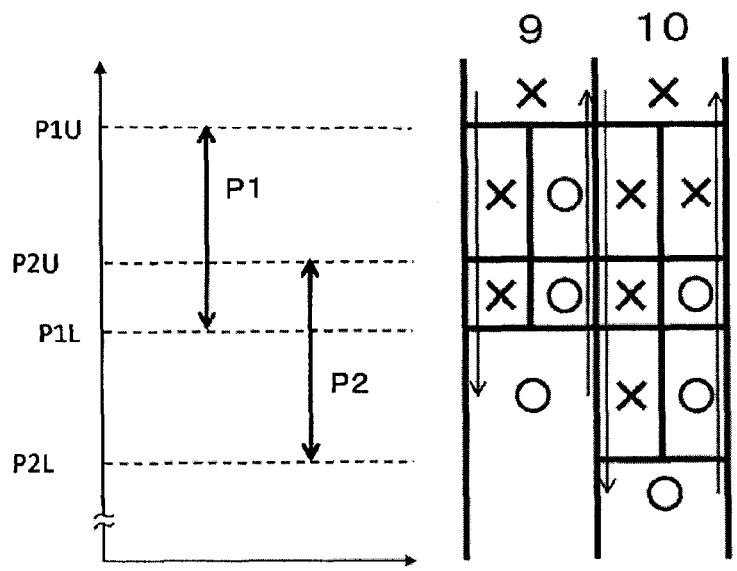
FIG. 2 is a view showing one example of a set pressure region in each unit when each driven machine is a compressor in the steam system of FIG. 1.

The set pressure of the steam drive-type compressor unit 2 is preferably set higher than the set pressure of the electric drive-type compression unit 3. Specifically, the prime movers (steam engine 4, electric motor 10) are individually controlled by each controller 8, 12 in each compressor unit 2, 3 to maintain the air pressure in the air tank 21 to a set pressure region. FIG. 2 is a view showing one example of the set pressure region in each compressor unit 2, 3 and an operating state of the steam supply valve 9 and the electric motor 10 in each pressure region. In FIG. 2, the table on the right side shows the opening/closing of the steam supply valve 9 and the presence of operation of the electric motor 10 in each pressure region in the graph on the left side. With respect to the steam supply valve 9, "◯" indicates an opened state and "x" indicates a closed state, and with respect to the electric motor 10, "◯" indicates an operating state and "x," indicates a stopped state.

The first controller 8 controls the opening/closing of the steam supply valve 9 based on the detected pressure of the second pressure sensor 22 so as to maintain the interior of the air tank 21 to a first set pressure region P1. Specifically, the first controller 8 opens the steam supply valve 9 when the lower limit pressure P1L of the first set pressure region P1 is reached with the use of the compressed air, and closes the steam supply valve 9 when the upper limit pressure P1U of the first set pressure region P1 is reached. The second controller 12 controls the operation of the electric motor 10 based on the detected pressure of the second pressure sensor 22 so as to maintain the interior of the air tank 21 to a second set pressure region P2. Specifically, the second controller 12 operates the electric motor 10 when the lower limit pressure P2L of the second set pressure region P2 is reached, and stops the electric motor 10 when the upper limit pressure P2U of the second set pressure region P2 is reached.

The first set pressure region P1 and the second set pressure region P2 are set so that the steam drive-type compressor unit 2 is preferentially operated over the electric drive-type compressor unit 3 as long as steam request (steam load) is present. Specifically, the lower limit pressure P1L of the first set pressure region P1 is set higher than the lower limit pressure P2L of the second set pressure region P2, and the upper limit pressure P2U of the second set pressure region P2 is set lower than the upper limit pressure P1U of the first set pressure region P1.

In such a configuration, the steam supply valve 9 is closed and the electric motor 10 is stopped at the pressure exceeding the upper limit pressure P1U of the first set pressure region P1, as shown in the table on the right side of FIG. 2. Even if the pressure lowers from such a state, the steam supply valve 9 is held in the closed state until the lower limit pressure P1L of the first set pressure region P1 is reached, as shown in the leftmost column in the table. The steam supply valve 9 is held in the opened state in a region below the lower limit pressure P1L of the first set pressure region P1. If the pressure rises from such a state, the steam supply valve 9 is held in the opened state until the upper limit pressure P1U of the first set pressure region P1 is reached, as shown in the second column from the left in the table. The steam supply valve 9 is held in the closed state in a region beyond the upper limit pressure P1U of the first set pressure region P1.

As described above, the electric motor 10 is stopped at the pressure exceeding the upper limit pressure P1U of the first set pressure region P1. Even if the pressure lowers from such a state, the electric motor 10 is held in the stopped state until the lower limit pressure P2L of the second set pressure region P2 is reached, as shown in the second column from the right in the table. Meanwhile, the steam supply valve 9 is opened at the lower limit pressure P1L of the first set pressure region P1, as described above. The electric motor 10 is held in the operating state in a region below the lower limit pressure P2L of the second set pressure region P2. If the pressure rises from such a state, the electric motor 10 is held in the operating state until the upper limit pressure P2U of the second set pressure region P2 is reached, as shown in the rightmost column in the table. The steam supply valve 9 is also held in the opened state. The electric motor 10 is stopped in a region beyond the upper limit pressure P2U of the second set pressure region P2. The steam supply valve 9 is closed when the upper limit pressure P1U of the first set pressure region P1 is reached, as described above.

In such a configuration, the compressed air can be stably obtained even if the steam load is not present due to the backup of the electric motor 10. The compressed air can be obtained by the electric motor 10 at the startup of the steam boiler 13, that is, until the start of steam. After the start of steam, the compressed air can be obtained while preferentially operating the steam drive-type compression unit 2 as long as the steam load is present, that is, as long as the steam of the second steam head 15 is used. The steam is not supplied to the second steam header 15 through the steam engine 4, but the steam is supplied to the second steam header 15 through the by-pass path 16 if the steam load is present but the air load is not present.

When desiring to suppress the use of electricity as much as possible at the time of power peak in the summertime, the steam may be supplied to the steam engine 4 to drive the compressor 5 without using the electric motor 10 of large power consumption even when the steam load is not present. The electric power thus can be reduced.

The steam system of the present invention is not limited to the configuration of the above example, and can be appropriately changed. For instance, the steam engine 4 is a screw-type in the example described above, but may be a turbine type according to circumstances.

Each compressor 5, 11 are ON/OFF controlled in the example, but may be capacity controlled according to circumstances. In such a case, the adjustment of the opening degree of the steam supply valve 9 is easy and simple in the steam drive-type compressor unit 2, and the inverter control of the electric motor 10 is easy and simple in the electric drive-type compressor unit 3.

The usage load of the compressed air is detected by the second pressure sensor 22 arranged in the air tank 21 in the above example, but the second pressure sensor 22 may be arranged on the compressed air path 20, to which the compressed air is discharged from each compressor 5, 11, instead of the air tank 21. In this case, the installation of the air tank 21 may be omitted.

Furthermore, the usage load of the steam is detected by the first pressure sensor 19 arranged in the second steam header 15 in the above example, but the first pressure sensor 19 may be arranged on a tube path of after the merging of the steam exhaust path 7 from the steam engine 4 and the by-pass path 16 instead of the second steam header 15. In this case, the installation of the second steam header 15 may be omitted.

The controller 8, 12 is arranged in each unit 2, 3 in the above example, but may be united as a common controller. Each compressor 5, 11 of each unit 2, 3 may be made common in the above example, so that one common compressor may be controlled by the steam engine 4 and the electric motor 10.

The compressor is arranged in each unit 2, 3 in the above example, but the pump or the air blower may be installed in place of the compressor. In this case as well, the control is carried out similar to the above example.

Figure 3:
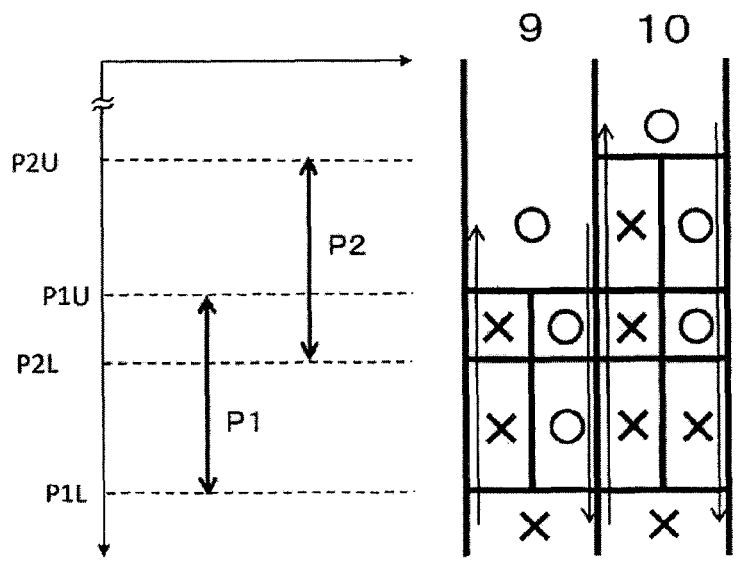
FIG. 3 is a view showing one example of a set pressure region in each unit when each driven machine is a vacuum pump in the steam system of FIG. 1.

The vacuum pump may be installed in place of the compressor. In such a case, the steam engine 4 or the electric motor 10 is controlled based on the pressure in the space from which each vacuum pump, driven by the steam engine 4 and the electric motor 10, takes in. In this case as well, each unit 2, 3 are preferably controlled so that the steam engine 4 is prioritized over the electric motor 10. In this case, each set pressure region P1, P2 is set as shown in FIG. 3, for example. The prime mover (steam engine 4, electric motor 10) is operated when the degree of vacuum lowers and the upper limit pressure (P1U, P2U) is reached, and the prime mover is stopped when the lower limit pressure (P1L, P2L) is reached.

Furthermore, the steam engine 4 and the electric motor 10 are used as the prime mover in the above example, but the electric motor 10 may be other prime movers that generate power using other than steam. For instance, the electric drive-type compressor unit 3 may be a reciprocal compressor by diesel engine.

The present invention enables efficient and stable operation by controlling the steam engine and the like based on both the steam load and the fluid load, and can be applied to various steam systems.

What is claimed is:

1. A steam system comprising:
   a first prime mover that generates power using steam;
   a first driven machine, driven by the first prime mover, for discharging, or taking in fluid;
   a second prime mover that generates power using other than steam;
   a second driven machine, driven by the second prime mover, for discharging or taking in fluid with respect to a space to which the fluid is discharged or from which the fluid is taken in by the first driven machine; and
   at least one controller for controlling the first prime mover and/or the second prime mover based on a steam load of an area where steam used in the first prime mover is supplied or based on a fluid load in the space to which the fluid is discharged or from which the fluid is taken in by each driven machine,
   wherein the at least one controller has at least two pressure sensors, and
   the at least one controller adjusts the opening and closing of a steam supply valve, including the opening degree of the valve, and
   wherein a drive ratio of the first prime mover and the second prime mover is changed based on a steam pressure, measured by at least one pressure sensor of said at least two pressure sensors, of the area where the steam used in the first prime mover is supplied and a pressure, measured by at least one pressure sensor of said at least two pressure sensors, in the space to which the fluid is discharged or from which the fluid is taken in by each driven machine, and
   a steam supply to the first prime mover is controlled based on the pressure, measured by said at least one of the two pressure sensors, in the space to which the fluid is discharged by each driven machine so as to maintain an interior of the space to a first set pressure region;
   the second prime mover is controlled based on the pressure, measured by said at least one of the two pressure sensors, in the space to which the fluid is discharged by each driven machine so as to maintain an interior of the space to a second set pressure region.

2. The steam system according to claim 1, wherein
   the first prime mover is controlled based on the steam pressure of the area where the steam used in the first prime mover is supplied and the pressure, measured by at least one pressure sensor of the at least two pressure sensors, in the space to which the fluid is discharged or from which the fluid is taken in by each driven machine; and
   the second prime mover is controlled based on the pressure, measured by at least one pressure sensor of the at least two pressure sensors, in the space to which the fluid is discharged or from which the fluid is taken in by each driven machine.

3. The steam system according to claim 2, wherein
   a lower limit pressure of the first set pressure region is set higher than a lower limit pressure of the second set pressure region, and an upper limit pressure of the second set pressure region is set lower than an upper limit pressure of the first set pressure region.

4. The steam system according to claim 2, wherein the steam is supplied to the first prime mover only when the steam pressure, measured by at least one pressure sensor of the at least two pressure sensors, of the area where the steam used in the first prime mover is supplied is smaller than a predetermined value.

5. The steam system according to claim 1, wherein
   the first prime mover is a screw-type steam engine;
   the first driven machine is an air compressor;
   the second prime mover is an electric motor; and
   the second driven machine is an air compressor.

6. The steam system according to claim 5, wherein
   compressed air from each driven machine is suppliable to a compressed air using device through a common tube path and/or a tank;
   steam from a steam supply source is suppliable to a steam header through the first prime mover and also suppliable to the steam header through a depressurization valve;
   the steam of the steam header is suppliable to a steam using device;
   the steam supply to the first prime mover is continued when determined that an air load is present in a case where a detected pressure of a pressure sensor arranged in the tube path or the tank is smaller than a set value and determined that a steam load is present in a case where a detected pressure of a pressure sensor arranged in the steam header is smaller than a predetermined value;
   the steam supply to the first prime mover is stopped when determined that the air load is not present in the case where the detected pressure of the pressure sensor arranged in the tube path or the tank is greater than or equal to the set value and determined that the steam load is not present in the case where the detected pressure of the pressure sensor arranged in the steam header is greater than or equal to the predetermined value; and
   only the second prime mover is operated when determined that the air load is present in the case where the detected pressure of the pressure sensor arranged in the tube path or the tank is smaller than the set value and determined that the steam load is not present in the case where the detected pressure of the pressure sensor arranged in the steam header is greater than or equal to the predetermined value.

7. The steam system according to claim 1, wherein
   the first driven machine and the second driven machine are configured as one common driven machine; and
   the common driven machine is drivable by the first prime mover and the second prime mover.

* * * * *